(12) United States Patent
Asghari-Kamrani et al.

(10) Patent No.: US 9,727,864 B2
(45) Date of Patent: *Aug. 8, 2017

(54) CENTRALIZED IDENTIFICATION AND AUTHENTICATION SYSTEM AND METHOD

(76) Inventors: Nader Asghari-Kamrani, Centreville, VA (US); Kamran Asghari-Kamrani, Centreville, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/606,538

(22) Filed: Sep. 7, 2012

(65) Prior Publication Data

US 2013/0036053 A1 Feb. 7, 2013
US 2017/0149566 A9 May 25, 2017

Related U.S. Application Data

(63) Continuation of application No. 12/210,926, filed on Sep. 15, 2008, now Pat. No. 8,266,432, which is a
(Continued)

(51) Int. Cl.
*G06Q 40/00* (2012.01)
*G06Q 20/40* (2012.01)
(Continued)

(52) U.S. Cl.
CPC ........... *G06Q 20/40* (2013.01); *G06Q 20/385* (2013.01); *G06Q 30/0225* (2013.01)

(58) Field of Classification Search
CPC .. G06Q 20/385; G06Q 20/40; G06Q 30/0225; G06Q 30/0235; G06Q 30/0248;
(Continued)

(56) References Cited

U.S. PATENT DOCUMENTS

| 4,747,050 A | 5/1988 | Brachtl et al. | |
| 4,885,778 A * | 12/1989 | Weiss | G06F 7/582 235/382 |

(Continued)

FOREIGN PATENT DOCUMENTS

| EP | 0722241 A2 | 7/1996 |
| EP | 1077436 A2 | 2/2001 |

(Continued)

OTHER PUBLICATIONS

Definition of "alphanumeric"; May 2, 2013, Wiktionary.org; Available at: http://en.wiktionary.org/wiki/alphanumeric.*
(Continued)

*Primary Examiner* — Kito R Robinson
(74) *Attorney, Agent, or Firm* — MH2 Technology Law Group, LLP

(57) ABSTRACT

A Central-Entity centralizes users' personal and financial information in a secure environment in order to prevent the distribution of user's information in e-commerce. This information is then used to create digital identity for the users. The digital identity of each user is dynamic, non-predictable and time dependent, because it is a combination of a user name and a dynamic, non-predictable and time dependent secure code that will be provided to the user for his identification. The user provides his digital identity to an External-Entity such as merchant or service provider. The External-Entity is dependent on Central-Entity to identify the user based on the digital identity given by the user. The External-Entity forwards the user's digital identity to the Central-Entity for identification and authentication of the user and the transaction.

15 Claims, 5 Drawing Sheets

Related U.S. Application Data continuation-in-part of application No. 11/239,046, filed on Sep. 30, 2005, now Pat. No. 7,444,676, which is a continuation-in-part of application No. 09/940,635, filed on Aug. 29, 2001, now Pat. No. 7,356,837, said application No. 12/210,926 is a continuation-in-part of application No. 11/333,400, filed on Jan. 18, 2006, now Pat. No. 8,281,129, which is a continuation-in-part of application No. 09/940,635.

(60) Provisional application No. 60/615,603, filed on Oct. 5, 2004, provisional application No. 60/650,137, filed on Feb. 7, 2005.

(51) Int. Cl.
*G06Q 20/38* (2012.01)
*G06Q 30/02* (2012.01)

(58) Field of Classification Search
CPC ........... G06Q 20/3674; G06Q 20/4014; G06Q 20/3276; G06Q 20/4012; G06Q 20/3227; G06F 21/31; G06F 2221/2115; G06F 21/44; G06F 11/3419; G06F 21/30
USPC ...................................................... 705/40, 44
See application file for complete search history.

(56) References Cited

U.S. PATENT DOCUMENTS

| | | | |
|---|---|---|---|
| 4,965,568 A | 10/1990 | Atalla et al. | |
| 5,535,276 A | 7/1996 | Ganesan | |
| 5,563,946 A * | 10/1996 | Cooper | G06F 21/10 705/52 |
| 5,592,553 A * | 1/1997 | Guski | H04L 9/3228 380/29 |
| 5,668,876 A | 9/1997 | Falk et al. | |
| 5,732,137 A | 3/1998 | Aziz | |
| 5,740,361 A | 4/1998 | Brown | |
| 5,790,785 A | 8/1998 | Klug | |
| 5,802,176 A | 9/1998 | Audebert | |
| 5,815,665 A | 9/1998 | Teper et al. | |
| 5,818,738 A * | 10/1998 | Effing | G06Q 20/341 702/117 |
| 5,838,812 A | 11/1998 | Pare, Jr. et al. | |
| 5,881,226 A | 3/1999 | Veneklase | |
| 5,883,810 A * | 3/1999 | Franklin | G06Q 20/02 235/379 |
| 6,067,621 A | 5/2000 | Yu et al. | |
| 6,078,908 A | 6/2000 | Schmitz | |
| 6,233,565 B1 | 5/2001 | Lewis et al. | |
| 6,236,981 B1 | 5/2001 | Hill | |
| 6,300,873 B1 | 10/2001 | Kucharczyk et al. | |
| 6,338,140 B1 | 1/2002 | Owens et al. | |
| 6,529,885 B1 | 3/2003 | Johnson | |
| 6,539,092 B1 | 3/2003 | Kocher | |
| 6,678,666 B1 | 1/2004 | Boulware | |
| 6,687,375 B1 * | 2/2004 | Matyas, Jr. | H04L 9/0866 380/30 |
| 6,715,082 B1 | 3/2004 | Chang et al. | |
| 6,748,367 B1 | 6/2004 | Lee | |
| 6,845,453 B2 | 1/2005 | Scheidt et al. | |
| 6,901,387 B2 * | 5/2005 | Wells | G06Q 20/04 705/35 |
| 6,993,658 B1 | 1/2006 | Engberg et al. | |
| 7,043,635 B1 | 5/2006 | Keech | |
| 7,065,786 B2 | 6/2006 | Taguchi | |
| 7,096,204 B1 | 8/2006 | Chen et al. | |
| 7,111,173 B1 | 9/2006 | Scheidt | |
| 7,150,038 B1 | 12/2006 | Samar | |
| 7,171,694 B1 | 1/2007 | Jespersen et al. | |
| 7,236,956 B1 | 6/2007 | Ogg et al. | |
| 7,237,117 B2 | 6/2007 | Weiss | |
| 7,324,972 B1 | 1/2008 | Oliver et al. | |
| 7,334,735 B1 | 2/2008 | Antebi et al. | |
| 7,353,541 B1 | 4/2008 | Ishibashi et al. | |
| 7,356,837 B2 | 4/2008 | Asghari-Kamrani et al. | |
| 7,392,388 B2 | 6/2008 | Keech | |
| 7,434,723 B1 | 10/2008 | White et al. | |
| 7,444,676 B1 | 10/2008 | Asghari-Kamrani | |
| 7,546,274 B2 | 6/2009 | Ingram et al. | |
| 7,822,666 B1 * | 10/2010 | Bursch | G06F 21/34 235/380 |
| 7,917,444 B1 * | 3/2011 | Bursch | 705/64 |
| 7,949,603 B1 * | 5/2011 | Cao | G06Q 20/042 705/35 |
| 8,245,292 B2 * | 8/2012 | Buer | G06F 21/34 713/172 |
| 8,266,432 B2 | 9/2012 | Asghari-Kamrani | |
| 8,281,129 B1 | 10/2012 | Asghari-Kamrani | |
| 8,751,801 B2 | 6/2014 | Harris et al. | |
| 2001/0032192 A1 * | 10/2001 | Putta | G06Q 20/04 705/76 |
| 2001/0044787 A1 | 11/2001 | Shwartz et al. | |
| 2001/0051924 A1 * | 12/2001 | Uberti | 705/44 |
| 2002/0040346 A1 | 4/2002 | Kwan | |
| 2002/0042781 A1 * | 4/2002 | Kranzley | 705/75 |
| 2002/0046187 A1 | 4/2002 | Vargas et al. | |
| 2002/0046189 A1 | 4/2002 | Morita et al. | |
| 2002/0069174 A1 | 6/2002 | Fox et al. | |
| 2002/0073046 A1 | 6/2002 | David | |
| 2002/0083347 A1 | 6/2002 | Taguchi | |
| 2002/0087483 A1 | 7/2002 | Harif | |
| 2002/0095569 A1 | 7/2002 | Jerdonek | |
| 2002/0120587 A1 | 8/2002 | D'Agostino | |
| 2002/0123935 A1 | 9/2002 | Asghari-Kamrani et al. | |
| 2002/0133412 A1 | 9/2002 | Oliver et al. | |
| 2002/0184143 A1 | 12/2002 | Khater | |
| 2002/0188481 A1 | 12/2002 | Berg et al. | |
| 2003/0046237 A1 | 3/2003 | Uberti | |
| 2003/0046571 A1 | 3/2003 | Nakayama | |
| 2003/0046591 A1 | 3/2003 | Asghari-Kamrani et al. | |
| 2003/0074317 A1 * | 4/2003 | Hofi | G06Q 20/382 705/44 |
| 2003/0080183 A1 | 5/2003 | Rajasekaran et al. | |
| 2003/0172272 A1 | 9/2003 | Ehlers et al. | |
| 2004/0030752 A1 | 2/2004 | Selgas et al. | |
| 2004/0103287 A1 * | 5/2004 | Newby | G07C 9/00023 713/184 |
| 2005/0010758 A1 | 1/2005 | Landrock et al. | |
| 2005/0222963 A1 | 10/2005 | Johnson | |
| 2006/0015725 A1 * | 1/2006 | Voice | H04L 63/0245 713/168 |
| 2006/0094403 A1 | 5/2006 | Norefors et al. | |
| 2006/0278698 A1 * | 12/2006 | Lovett | G06Q 20/24 235/380 |
| 2007/0016804 A1 | 1/2007 | Kemshall | |
| 2007/0022301 A1 | 1/2007 | Nicholson et al. | |
| 2007/0050840 A1 | 3/2007 | Grandcolas et al. | |
| 2007/0073621 A1 | 3/2007 | Dulin et al. | |
| 2007/0077916 A1 | 4/2007 | Saito | |
| 2007/0107050 A1 | 5/2007 | Selvarajan | |
| 2007/0130463 A1 | 6/2007 | Law et al. | |
| 2007/0174904 A1 | 7/2007 | Park | |
| 2008/0016003 A1 | 1/2008 | Hutchison et al. | |
| 2008/0230614 A1 * | 9/2008 | Boalt | G06F 21/34 235/492 |
| 2010/0070757 A1 * | 3/2010 | Martinez | H04L 63/0846 713/155 |
| 2010/0100724 A1 | 4/2010 | Kaliski, Jr. | |
| 2013/0036053 A1 | 2/2013 | Asghari-Kamrani | |
| 2013/0191889 A1 | 7/2013 | Asghari-Kamrani | |
| 2014/0067675 A1 * | 3/2014 | Leyva | G06Q 20/40 705/44 |
| 2014/0372767 A1 * | 12/2014 | Green | G06F 7/588 713/189 |

FOREIGN PATENT DOCUMENTS

| | | |
|---|---|---|
| EP | 1107089 A1 | 6/2001 |
| GB | 9929291.4 | 1/2001 |
| GB | 2352861 A | 2/2001 |

(56) References Cited

FOREIGN PATENT DOCUMENTS

| SI | EP 1445917 A2 * | 8/2004 | ............. G06F 21/43 |
|---|---|---|---|
| WO | 95/19593 A1 | 7/1995 | |
| WO | 97/31306 A1 | 8/1997 | |
| WO | 0002150 A1 | 1/2000 | |
| WO | 0072109 A2 | 11/2000 | |
| WO | 01/99382 A2 | 12/2001 | |

OTHER PUBLICATIONS

Strack, R. (1996). Challenges in mobile information systems and services Retrieved from https://dialog.proquest.com/professional/professional/docview/828562573?accountid=142257 on Mar. 28, 2017.*
Guski, R. H., Larson, R. C., Matyas Jr, S.,M., Johnson, D. B., & Coppersmith, D.Authentication system using one-time passwords Retrieved from https://dialog.proquest.com/professional/professional/docview/1740394879?accountid=142257 on Mar. 28, 2017.*
Implementing Strong Passwords in an NDS Environment, Novell Aug. 2000 (7 pgs.).
Policy-Based Management of Mobile Phones, Novell Mar. 2001 (7 pgs.).
Mobile Security; Authentication and Authorization in Mobile Environment, Teppo Halonen, 2001 (17 pgs).
U.S. Appl. No. 13/633,680.
RFC 2560, Network Working Group (dated Jun. 1999).
ISI Research Report, ISI/RS-94-399 (dated Sep. 1994).
Nader Asghari-Kamrani et al. v. United Services Automobile Association, No. 2:15-cv-478-RGD-LRL (E.D. Va. filed Oct. 30, 2015) (asserting related U.S. Pat. No. 8,266,432).
United Services Automobile Association v. Nader Asghari Kamrani et al., IPR2015-01842 (inter partes review of related U.S. Pat. No. 8,266,432).
Lynn M. Lopucki, "Human Identification Theory and the Identity Theft Problem", Texas Law Review, vol. 80, 2001, pp. 89-134.
Daniel J. Solove, "Identity Theft, Privacy, and the Architechture of Vulnerability", Hastings Law Journal, vol. 54, No. 4, 2003, pp. 1-47.
"Experts struggle to tight online 'phishing' schemes", 2006, Retrieved from the internet: http://mybroadband.co.za/nephp/2254.html, pp. 1-3.
"2-Factor Authentication: Will Financial Institutions Really be More Secure", 2006, Retrieved from the internet: http://www.prweb.com/releases/2006/02/prweb342996.htm, pp. 1-4.
Federal Financial Institutions Examination Council, "Authentication in an Internet Banking Environment", 2001, Retrieved from the internet: https://www.ffiec.gov/pdf/authentication_guidance_pdf, pp. 1-14.
PTO Non-Final Office Action dated Oct. 8, 2014, U.S. Appl. No. 13/633,680, pp. 1-21.
PTO Final Office Action dated Mar. 13, 2015, U.S. Appl. No. 13/633,680, pp. 1-10.
PTO Non-Final Office Action dated Oct. 19, 2015, U.S. Appl. No. 13/633,680, pp. 1-13.
PTO Final Office Action dated Mar. 23, 2016, U.S. Appl. No. 13/633,680, pp. 1-11.
PTO Notice of Allowance dated Sep. 12, 2016, U.S. Appl. No. 13/633,680, pp. 1-16.
PTO Notice of Allowance dated Dec. 2, 2016, U.S. Appl. No. 13/633,680, pp. 1-16.
*Nader Asghari-Kamrani and Kamran Asghari-Kamrani* vs. *United Services Automobile Association*, Opinion and Order dated Jul. 5, 2016, pp. 1-13.
*United Services Automobile Association* vs. *Nader Asghari-Kamrani and Kamran Asghari-Kamrani*, Case CBM2016-00064, Decision: Granting Institution of Covered Business Method Patent Review 37 C.F.R. § 42.208 dated Sep. 21, 2016, pp. 1-36.
*United Services Automobile Association* vs. *Nader Asghari-Kamrani and Kamran Asghari-Kamrani*, Case CBM2016-00063, Decision: Granting Institution of Covered Business Method Patent Review 37 C.F.R. § 42.208 dated Sep. 21, 2016, pp. 1-42.
*Nader Asghari-Kamrani and Kamran Asghari-Kamrani* vs. *United Services Automobile Association*, Case 2:15-cv-00478-RGD-LRL, USAA's First Amended Counterclaims to First Amended Complaint dated Mar. 29, 2016, pp. 1-18.
*Nader Asghari-Kamrani and Kamran Asghari-Kamrani* vs. *United Services Automobile Association*, Case 2:15-cv-00478-RGD-LRL, USAA's First Amended Counterclaims to Plaintiffs' Second Amended Complaint dated Oct. 4, 2016, pp. 1-35.
*Nader Asghari-Kamrani and Kamran Asghari-Kamrani* vs. *United Services Automobile Association*, Case 2:15-cv-00478-RGD-LRL, USAA's Answer and Counterclaims to Plaintiffs' Second Amended Complaint dated Apr. 28, 2016, pp. 1-28.
*Nader Asghari-Kamrani and Kamran Asghari-Kamrani* vs. *United Services Automobile Association*, Case 2:15-cv-00478-RGD-LRL, USAA's Answer and Counterclaims to First Amended Complaint dated Mar. 8, 2016, pp. 1-22.

* cited by examiner

CENTRALIZED IDENTIFICATION AND AUTHENTICATION SYSTEM AND METHOD

RELATED APPLICATIONS

This application is a continuation of U.S. patent application Ser. No. 12/210,926 filed Sep. 15, 2008 by the same inventors and bearing the same title now U.S. Pat. No. 8,266,432 issued on Sep. 11, 2012. U.S. patent application Ser. No. 12/210,926 is a continuation-in-part of U.S. patent application Ser. No. 11/239,046 filed Sep. 30, 2005 by the same inventors now U.S. Pat. No. 7,444,676 issued on Oct. 28, 2008. U.S. patent application Ser. No. 11/239,046 is a continuation-in-part of U.S. patent application Ser. No. 09/940,635 filed Aug. 29, 2001 by the same inventors and bearing the same title now U.S. Pat. No. 7,356,837 issued on Apr. 8, 2008. U.S. patent application Ser. No. 11/239,046 claims priority to U.S. Provisional Patent Application No. 60/615,603 filed Oct. 5, 2004 by the same inventors.

BACKGROUND OF THE INVENTION

1. Field of the Invention

The present invention relates to a centralized identification and authentication system and method for identifying an individual over a communication network such as Internet, to increase security in e-commerce. More particularly a method and system for generation of a dynamic, non-predictable and time dependent SecureCode for the purpose of positively identifying an individual.

2. Description of the Related Art

The increasing use of the Internet and the increase of businesses utilizing e-commerce have lead to a dramatic increase in customers releasing confidential personal and financial information, in the form of social security numbers, names, addresses, credit card numbers and bank account numbers, to identify themselves. This will allow them to get access to the restricted web sites or electronically purchase desired goods or services. Unfortunately this type of identification is not only unsafe but also it is not fool proof that the user is really the person he says he is. The effect of these increases is reflected in the related art.

U.S. Pat. No. 5,732,137 issued to Aziz outlines a system and method for providing remote user authentication in a public computer network such as the Internet. More specifically, the system and method provides for remote authentication using a one-time password scheme having a secure out-of-band channel for initial password delivery.

U.S. Pat. No. 5,815,665 issued to Teper et al. outlines the use of a system and method for enabling consumers to anonymously, securely and conveniently purchase on-line services from multiple service providers over a distributed network, such as the Internet. Specifically, a trusted third-party broker provides billing and security services for registered service providers via an online brokering service, eliminating the need for the service providers to provide these services.

U.S. Pat. No. 5,991,408 issued to Pearson, et al. outlines a system and method for using a biometric element to create a secure identification and verification system, and more specifically to an apparatus and a method for creating a hard problem which has a representation of a biometric element as its solution.

Although each of the previous patents outline a valuable system and method, what is really needed is a system and method that offers digital identity to the users and allows them to participate in e-commerce without worrying about the privacy and security. In addition to offering security and privacy to the users, the new system has to be simple for businesses to adopt and also doesn't require the financial institutions to change their existing systems. Such a secure, flexible and scalable system and method would be of great value to the businesses that would like to participate in today's electronic commerce.

None of the above inventions and patents, taken either singularly or in combination, is seen to describe the instant invention as claimed. Thus a centralized identification and authentication system and method solving the aforementioned problems is desired.

For convenience, the term "user" is used throughout to represent both a typical person consuming goods and services as well as a business consuming goods and services.

As used herein, a "Central-Entity" is any party that has user's personal and/or financial information, UserName, Password and generates dynamic, non-predictable and time dependent SecureCode for the user. Examples of Central-Entity are: banks, credit card issuing companies or any intermediary service companies.

As also used herein, an "External-Entity" is any party offering goods or services that users utilize by directly providing their UserName and SecureCode as digital identity. Such entity could be a merchant, service provider or an online site. An "External-Entity" could also be an entity that receives the user's digital identity indirectly from the user through another External-Entity, in order to authenticate the user, such entity could be a bank or a credit card issuing company.

The term "UserName" is used herein to denote any alphanumeric name, id, login name or other identification phrase, which may be used by the "Central-Entity" to identify the user.

The term "Password" is used herein to denote any alphanumeric password, secret code, PIN, prose phrase or other code, which may be stored in the system to authenticate the user by the "Central-Entity".

The term "SecureCode" is used herein to denote any dynamic, non-predictable and time dependent alphanumeric code, secret code, PIN or other code, which may be broadcast to the user over a communication network, and may be used as part of a digital identity to identify a user as an authorized user.

The term "digital identity" is used herein to denote a combination of user's "SecureCode" and user's information such as "UserName", which may result in a dynamic, non-predictable and time dependent digital identity that could be used to identify a user as an authorized user.

The term "financial information" is used herein to denote any credit card and banking account information such as debit cards, savings accounts and checking accounts.

SUMMARY OF THE INVENTION

The invention relates to a system and method provided by a Central-Entity for centralized identification and authentication of users and their transactions to increase security in e-commerce. The system includes:

A Central-Entity: This entity centralizes users personal and financial information in a secure environment in order to prevent the distribution of user's information in e-commerce. This information is then used to create digital identity for the users. The users may use their digital identity to identify themselves instead of providing their personal and financial information to the External-Entities;

A plurality of users: A user represents both a typical person consuming goods and services as well as a business consuming goods and services, who needs to be identified in order to make online purchases or to get access to the restricted web sites. The user registers at the Central-Entity to receive his digital identity, which is then provided to the External-Entity for identification;

A plurality of External-Entities: An External-Entity is any party offering goods or services in e-commerce and needs to authenticate the users based on digital identity.

The user signs-up at the Central-Entity by providing his personal or financial information. The Central-Entity creates a new account with user's personal or financial information and issues a unique UserName and Password to the user. The user provides his Username and Password to the Central-Entity for identification and authentication purposes when accessing the services provided by the Central-Entity. The Central-Entity also generates dynamic, non-predictable and time dependent SecureCode for the user per user's request and issues the SecureCode to the user. The Central-Entity maintains a copy of the SecureCode for identification and authentication of the user's digital identity. The user presents his UserName and SecureCode as digital identity to the External-Entity for identification. When an External-Entity receives the user's digital identity (UserName and SecureCode), the External-Entity will forward this information to the Central-Entity to identify and authenticate the user. The Central-Entity will validate the information and sends an approval or denial response back to the External-Entity.

There are also communications networks for the user, the Central-Entity and the External-Entity to give and receive information between each other.

This invention also relates to a system and method provided by a Central-Entity for centralized identification and authentication of users to allow them access to restricted web sites using their digital identity, preferably without revealing confidential personal or financial information.

This invention further relates to a system and method provided by a Central-Entity for centralized identification and authentication of users to allow them to purchase goods and services from an External-Entity using their digital identity, preferably without revealing confidential personal or financial information.

Accordingly, it is a principal object of the invention to offer digital identity to the users for identification in e-commerce.

It is another object of the invention to centralize user's personal and financial information in a secure environment.

It is another object of the invention to prevent the user from distributing their personal and financial information.

It is a further object of the invention to keep merchants, service providers, Internet sites and financial institutions satisfied by positively identifying and authenticating the users.

It is another object of the invention to reduce fraud and increase security for e-commerce.

It is another object of the invention to allow businesses to control visitor's access to their web sites.

It is another object of the invention to protect the customer from getting bills for goods and services that were not ordered.

It is another object of the invention to increase customers' trust and reduce customers' fear for e-commerce.

It is another object to decrease damages to the customers, merchants and financial institutions.

It is an object of the invention to provide improved elements and arrangements thereof for the purposes described which are inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
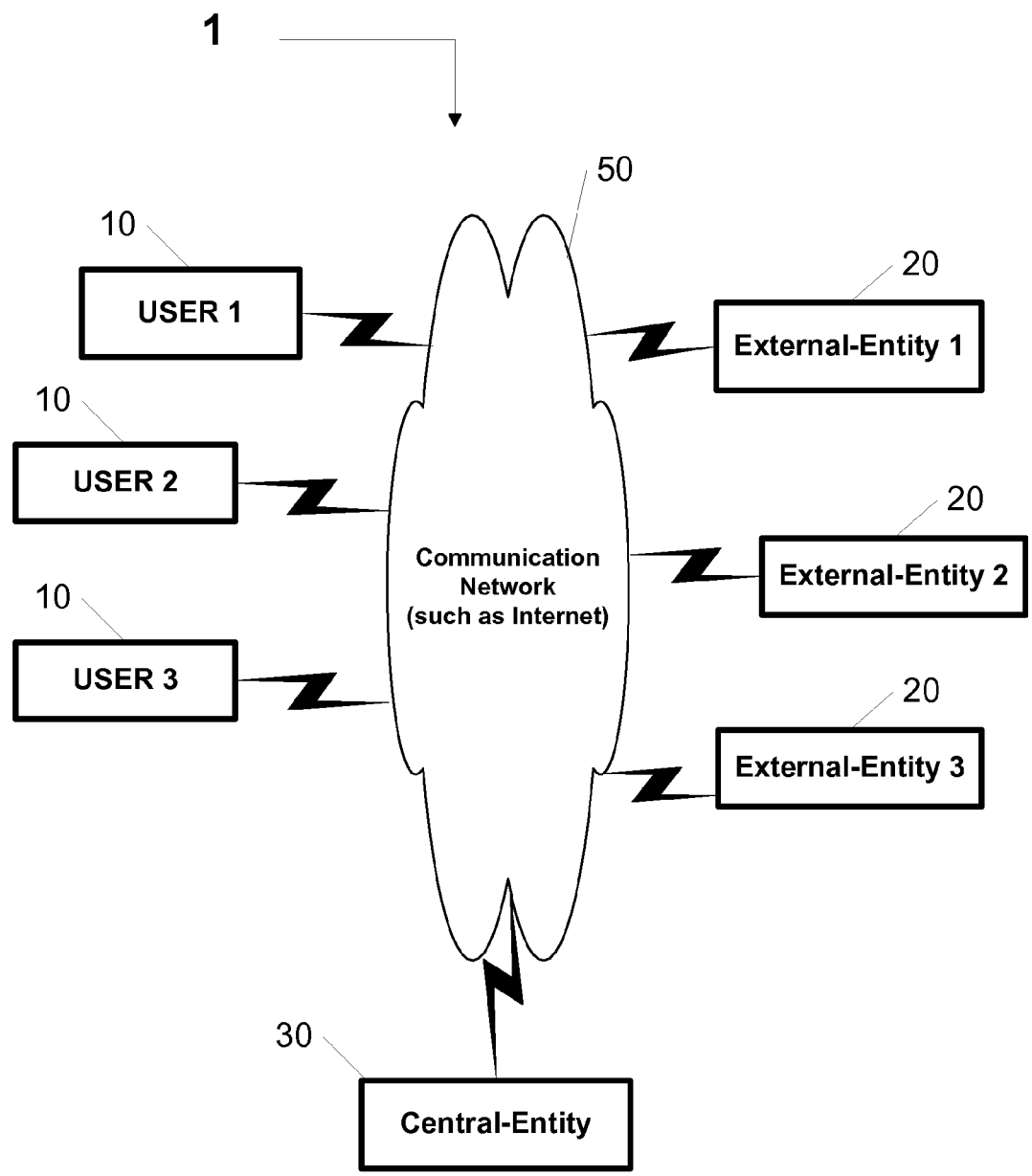
FIG. 1 is a high-level overview of a centralized identification and authentication system and method according to the present invention.

The invention relates to a system 1 and method 2 to identify and authenticate the users and their transactions to increase security in e-commerce. FIG. 1 illustrates a system to positively identify the users 10 in e-commerce based on digital identity.

The system 1 comprises a plurality of users 10, a plurality of External-Entities 20 with goods and services that are desired by the users 10 and a Central-Entity 30 providing a unique UserName and Password to the users 10 and generating dynamic, non-predictable and time dependent SecureCode for the users 10 per user's request. There are also communication networks 50 for the user 10, the Central-Entity 30 and the External-Entity 20 to give and receive information between each other.

It would be desirable to develop a new system 1 and method 2 to centralize user's personal and financial information in a secure environment and to offer digital identity to the users 10 in order to provide privacy, increase security and reduce fraud in e-commerce. Ideally, a secure identification and authentication system 1 would identify legitimate users 10 and unauthorized users 10. This would increase the user's trust, which leads to more sales and cash flow for the merchants/service providers.

The present invention relates to a system 1 and method 2 to support this ideal identification and authentication system. For identification purpose, a digital identity (a unique UserName and a dynamic, non-predictable and time dependent SecureCode) is used by the user 10 at the time of ordering or at the time of accessing a restricted Internet site. A series of steps describing the overall method are conducted between the users 10, the Central-Entity 30 and the External-Entity 20 and are outlined in FIG. 3,4,5.

Figure 2:
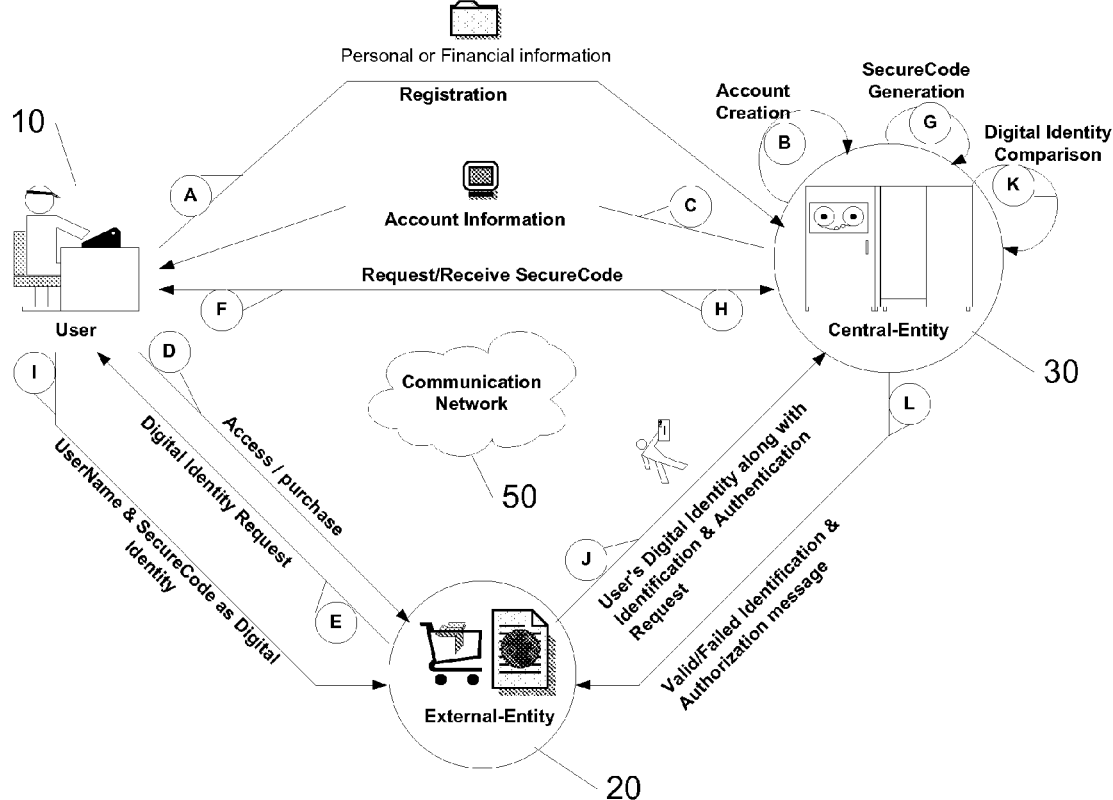
FIG. 2 is a detailed overview of a centralized identification and authentication system and method according to the present invention.
Figure 3:
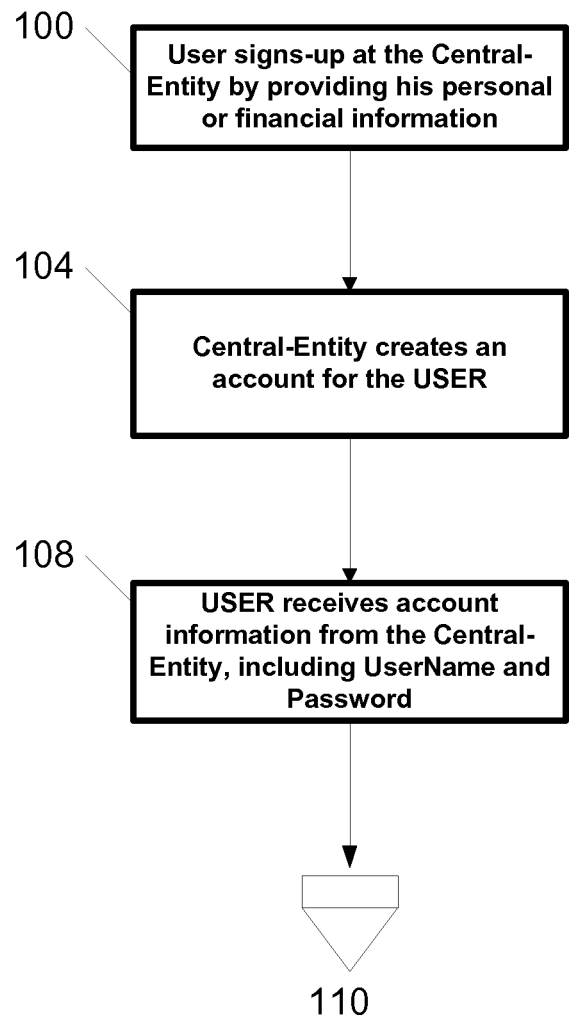
FIG. 3 is a block diagram of the registration of a customer utilizing a centralized identification and authentication system and method according to the present invention.

There are three distinct phases involved in using the centralized identification and authentication system FIG. 2, the first of which being the registration phase, which is depicted in FIG. 3. During the registration phase, the user 10 provides his personal or financial information to the Central-Entity 30. The user 10 registers at the Central-Entity 30, 100, 104 and receives his account and login information such as UserName and Password 108. User 10 can access his account at any time by accessing the Central-Entity's system using a communication network 50 and logging into the system.

Figure 4:
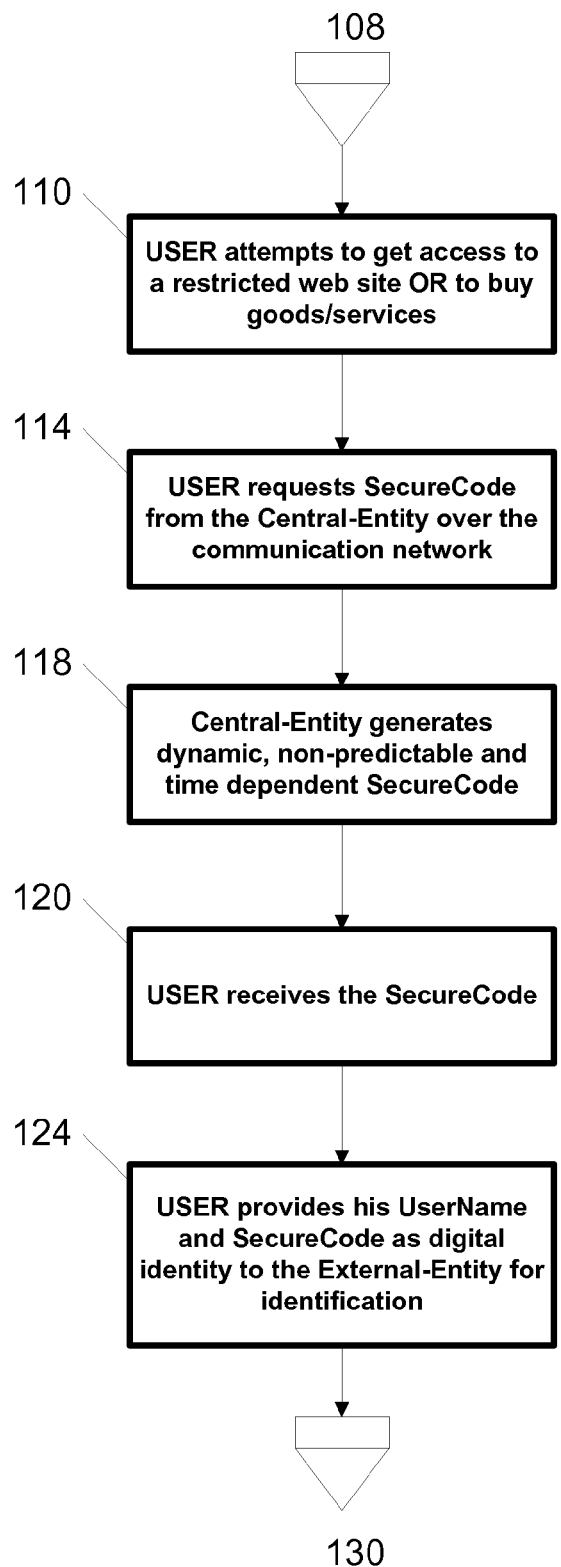
FIG. 4 is a block diagram of the transaction of a customer utilizing a centralized identification and authentication system and method according to the present invention.

Next is the transaction phase, where the user 10 attempts to access a restricted web site or attempts to buy services or products 110, as illustrated in FIG. 4, through a standard interface provided by the External-Entity 20, similar to what exists today and selects digital identity as his identification and authorization or payment option. The External-Entity 20 displays the access or purchase authorization form requesting the user 10 to authenticate himself using his UserName and SecureCode as digital identity. The user 10 requests SecureCode from the Central-Entity 30 by accessing his account over the communication network 50, 114. The Central-Entity 30 generates dynamic, non-predictable and time dependent SecureCode 118 for the user 10. The Central-Entity 30 maintains a copy of the SecureCode for identification and authentication of the user 10 and issues the SecureCode to the user 10. When the user 10 receives the SecureCode 120, the user 10 provides his UserName and SecureCode as digital identity to the External-Entity 20, 124, FIG. 4.

Figure 5:
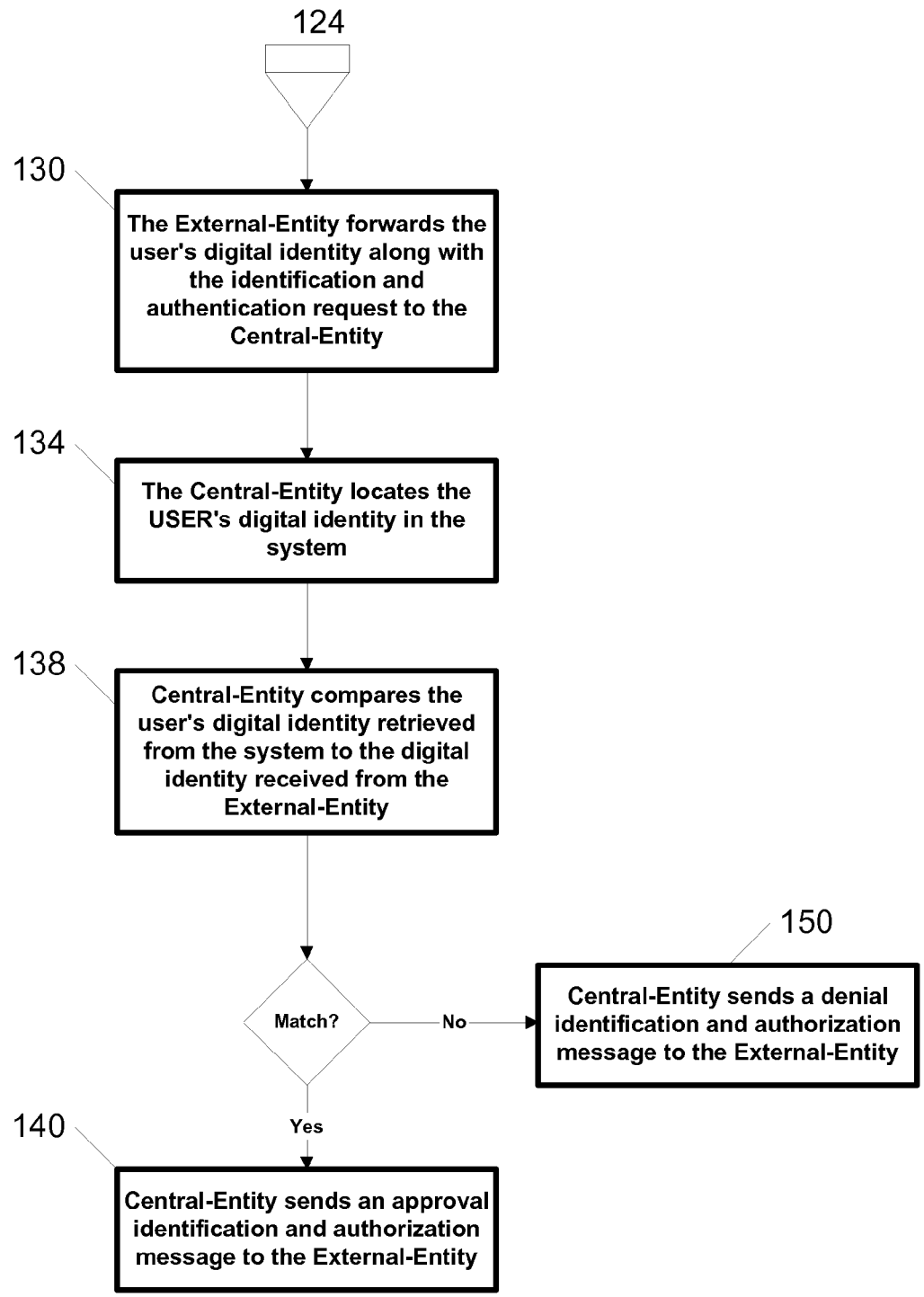
FIG. 5 is a block diagram of a Central-Entity authorizing a user utilizing a centralized identification and authentication system and method according to the present invention.

The third phase is identification and authorization phase. Once the user 10 provides his digital identity to the External-Entity 20, the External-Entity 20 forwards user's digital identity along with the identification and authentication request to the Central-Entity 30, 130, as illustrated in FIG. 5. When the Central-Entity 30 receives the request containing the user's digital identity, the Central-Entity 30 locates the user's digital identity (UserName and SecureCode) in the system 134 and compares it to the digital identity received from the External-Entity 20 to identify and validate the user 10, 138. The Central-Entity 30 generates a reply back to the External-Entity 20 via a communication network 50 as a result of the comparison. If both digital identities match, the Central-Entity 30 will identify the user 10 and will send an approval of the identification and authorization request to the External-Entity 20, 140, otherwise will send a denial of the identification and authorization request to the External-Entity 20, 150. The External-Entity 20 receives the approval or denial response in a matter of seconds. The External-Entity 20 might also display the identification and authentication response to the user 10.

To use the digital identity feature, the Central-Entity 30 provides the authorized user 10 the capability to obtain a dynamic, non-predictable and time dependent SecureCode. The user 10 will provide his UserName and SecureCode as digital identity to the External-Entity 20 when this information is required by the External-Entity 20 to identify the user 10.

The Central-Entity 30 may add other information to the SecureCode before sending it to the user 10, by algorithmically combining SecureCode with user's information such as UserName. The generated SecureCode will have all the information needed by the Central-Entity 30 to identify the user 10. In this case the user will only need to provide his SecureCode as digital identity to the External-Entity 20 for identification.

In the preferred embodiment, the user 10 uses the communication network 50 to receive the SecureCode from the Central-Entity 30. The user 10 submits the SecureCode in response to External-Entity's request 124. The SecureCode is preferably implemented through the use of an indicator. This indicator has two states: "on" for valid and "off" for invalid. When the user 10 receives the SecureCode, the SecureCode is in "on" or "valid" state. The Central-Entity 30 may improve the level of security by invalidating the SecureCode after it's use. This may increase the level of difficulty for unauthorized user. Two events may cause a valid SecureCode to become invalid:
  1. Timer event: This event occurs when the predefined time passes. As mentioned above the SecureCode is time dependent.
  2. Validation event: This event occurs when the SecureCode forwarded to the Central-Entity 30 (as part of digital identity) corresponds to the user's SecureCode held in the system. When this happens the Central-Entity 30 will invalidate the SecureCode to prevent future use and sends an approval identification and authorization message to the External-Entity 20,140.

A valid digital identity corresponds to a valid SecureCode. When the SecureCode becomes invalid, the digital identity will also become invalid.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An authentication computer system to enhance computer network security by authenticating a plurality of users during electronic transactions that are engaged in between the plurality of users and a transaction computer system, the authentication computer system comprising:
   a dynamic-code generator to generate a plurality of substantially non-predictable digital codes;
   a computer-readable memory to store the generated digital codes;
   a timer to generate an electronic timer signal;
   a network receiver to receive digital requests from the transaction computer system or the plurality of users;
   a network transmitter to transmit digital message to the transaction computer system and one or more electronic devices of the plurality of users, the users and their one or more electronic devices being located physically remote from the authentication computer system; and
   a computer processor electronically coupled to the timer, the computer-readable memory, the network receiver, and the network transmitter to:
      during an electronic transaction that is engaged in between one of the users and the transaction computer system, receive a digital request for a digital code for authenticating the user via the network receiver,
      during the electronic transaction and in response to the digital request, transmit one of the generated digital codes for the user to one of the electronic devices of the user via the network transmitter, wherein the digital code received by the user is only valid for one authentication and only valid for authentication of the user, during the electronic transaction, receive a digital authentication request for authenticating the user from the transaction computer system via the network receiver, the digital authentication request comprising a digital identity corresponding to the user, the digital identity including the digital code, receive the electronic timer signal to evaluate a validity of one or more of the digital codes, and during the electronic transaction, determine if there is a match between the received digital code and one of the generated digital codes and the received digital code is valid to authenticate the user, and, if there is a match and the received digital code is valid, (i) transmit a digital authentication approval message to the transaction computer system via the network transmitter wherein the digital authentication approval message indicates to the transaction computer system that the user is authentic and (ii) prevent multiple uses of the digital code.

2. The authentication computer system of claim 1, wherein the authentication computer system is adapted to serve a plurality of transaction computer systems.

3. The authentication computer system of claim 1, wherein the transaction computer system is adapted to detect an attempt to use each of the plurality of digital codes beyond a first use and determines a time delay based on the electronic timer signal so as to use each of the plurality of digital codes only within a limited time.

4. The authentication computer system of claim 1, wherein the digital code is alphanumeric.

5. The authentication computer system of claim 1, wherein the digital code is numeric.

6. The authentication computer system of claim 1, wherein the matching of the received digital code and the transmission of the digital authentication approval message to the transaction computer system is performed in a matter of seconds.

7. The authentication computer system of claim 1, wherein the digital code, the user specific information and a current time are used to authenticate the user.

8. An authentication computer system to enhance computer network security by authenticating a user during an electronic transaction that is engaged in between the user and a transaction computer system, the authentication computer system comprising:

a dynamic-code generator to generate a substantially non-predictable digital code;

a computer-readable memory to store the generated digital code;

a timer to generate an electronic timer signal;

a network receiver to receive digital requests from the transaction computer system or the user;

a network transmitter to transmit digital message to the transaction computer system and an electronic device of the user, the user and its electronic device being located physically remote from the authentication computer system; and a computer processor electronically coupled to the timer, the computer-readable memory, the network receiver, and the network transmitter to:

during an electronic transaction that is engaged in between the user and the transaction computer system, receive a digital request for a digital code for authenticating the user via the network receiver, during the electronic transaction and in response to the digital request, transmit the generated digital code to the electronic device of the user via the network transmitter, wherein the digital code received by the user is only valid for one authentication and only valid for authentication of the user, during the electronic transaction, receive a digital authentication request for authenticating the user from the transaction computer system via the network receiver, the digital authentication request comprising a digital identity corresponding to the user, the digital identity including the digital code, receive the electronic timer signal to evaluate a validity of the digital code, and during the electronic transaction, determine if there is a match between the received digital code and the generated digital code and the received digital code is valid to authenticate the user, and, if there is a match and the received digital code is valid, (i) transmit a digital authentication approval message to the transaction computer system via the network transmitter wherein the digital authentication approval message indicates to the transaction computer system that the user is authentic and (ii) prevent multiple uses of the digital code.

9. The authentication computer system of claim 8, wherein the generated digital code is transformed by algorithmic combination with user specific information for the user.

10. The authentication computer system of claim 8, wherein the digital code has a validity indicator.

11. The authentication computer system of claim 8, wherein the digital code is alphanumeric.

12. The authentication computer system of claim 8, wherein the digital code is numeric.

13. The authentication computer system of claim 8, wherein the authentication computer system is adapted to serve a plurality of transaction computer systems.

14. The authentication computer system of claim 8, wherein the matching of the received digital code and the transmission of the digital authentication approval message to the transaction computer system is performed in a matter of seconds.

15. The authentication computer system of claim 8, wherein the digital code, the user specific information and a current time are used to authenticate the user.

* * * * *